(12) United States Patent
Sakhnini et al.

(10) Patent No.: US 12,342,202 B2
(45) Date of Patent: Jun. 24, 2025

(54) REPORTING MODEL PARAMETER INFORMATION FOR LAYER 1 MEASUREMENT PREDICTION

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 17/805,598

(22) Filed: Jun. 6, 2022

(65) Prior Publication Data

US 2023/0397028 A1 Dec. 7, 2023

(51) Int. Cl.
*H04W 24/10* (2009.01)
*H04L 41/14* (2022.01)
*H04W 24/08* (2009.01)
*H04B 7/06* (2006.01)

(52) U.S. Cl.
CPC .......... *H04W 24/10* (2013.01); *H04L 41/145* (2013.01); *H04W 24/08* (2013.01); *H04B 7/0626* (2013.01)

(58) Field of Classification Search
CPC ...... H04W 24/10; H04W 24/08; H04L 41/145

USPC ......................................................... 370/252
See application file for complete search history.

(56) References Cited

U.S. PATENT DOCUMENTS

| | | | | |
|---|---|---|---|---|
| 10,374,882 | B2* | 8/2019 | Sheen et al. | H04L 41/0816 |
| 11,343,014 | B2* | 5/2022 | Wang et al. | H04B 7/0626 |
| 11,399,299 | B2* | 7/2022 | Liu et al. | H04L 1/0026 |
| 11,558,097 | B2* | 1/2023 | Yerramalli et al. | H04B 17/3913 |
| 11,729,810 | B2* | 8/2023 | Xia et al. | H04W 72/542 |
| 2021/0351885 | A1* | 11/2021 | Chavva et al. | H04L 5/0048 |
| 2023/0262506 | A1* | 8/2023 | Yang et al. | H04W 24/10 |
| 2023/0389115 | A1* | 11/2023 | Wu et al. | G06N 20/00 |

* cited by examiner

*Primary Examiner* — Christopher M Crutchfield
*Assistant Examiner* — Syed Ahmed
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive configuration information that includes a rule for transmitting model parameter information associated with a model for predicting a Layer 1 (L1) measurement or for transmitting a combination of the model parameter information and an L1 measurement report. The UE may transmit the model parameter information or the combination based at least in part on the rule. Numerous other aspects are described.

20 Claims, 10 Drawing Sheets

REPORTING MODEL PARAMETER INFORMATION FOR LAYER 1 MEASUREMENT PREDICTION

FIELD OF THE DISCLOSURE

Aspects of the present disclosure generally relate to wireless communication and to techniques and apparatuses for reporting model parameter information for Layer 1 measurement prediction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information that includes a rule for transmitting model parameter information associated with a model for predicting a Layer 1 (L1) measurement or for transmitting a combination of the model parameter information and an L1 measurement report. The method may include transmitting the model parameter information or the combination based at least in part on the rule.

Some aspects described herein relate to a method of wireless communication performed by a UE. The method may include receiving configuration information that includes a rule for transmitting model parameter information associated with a model for predicting an L1 measurement or for transmitting a combination of the model parameter information and an L1 measurement report. The method may include transmitting the model parameter information or the combination based at least in part on the rule.

Some aspects described herein relate to a method of wireless communication performed by a network entity. The method may include transmitting configuration information that includes a rule for transmitting model parameter information associated with a model for predicting an L1 measurement or for transmitting a combination of the model parameter information and an L1 measurement report. The method may include receiving the model parameter information or the combination based at least in part on the rule.

Some aspects described herein relate to a UE for wireless communication. The UE may include a memory and one or more processors coupled to the memory. The one or more processors may be configured to receive configuration information that includes a rule for transmitting model parameter information associated with a model for predicting an L1 measurement or for transmitting a combination of the model parameter information and an L1 measurement report. The one or more processors may be configured to transmit the model parameter information or the combination based at least in part on the rule.

Some aspects described herein relate to a UE for wireless communication. The UE may include a memory and one or more processors coupled to the memory. The one or more processors may be configured to receive configuration information that includes a rule for transmitting model parameter information associated with a model for predicting an L1 measurement or for transmitting a combination of the model parameter information and an L1 measurement report. The one or more processors may be configured to transmit the model parameter information or the combination based at least in part on the rule.

Some aspects described herein relate to a network entity for wireless communication. The network entity may include a memory and one or more processors coupled to the memory. The one or more processors may be configured to transmit configuration information that includes a rule for transmitting model parameter information associated with a model for predicting an L1 measurement or for transmitting a combination of the model parameter information and an L1 measurement report. The one or more processors may be configured to receive the model parameter information or the combination based at least in part on the rule.

Some aspects described herein relate to a non-transitory computer-readable medium that stores a set of instructions for wireless communication by a UE. The set of instructions, when executed by one or more processors of the UE, may cause the UE to receive configuration information that includes a rule for transmitting model parameter information associated with a model for predicting an L1 measurement or for transmitting a combination of the model parameter information and an L1 measurement report. The set of instructions, when executed by one or more processors of the UE, may cause the UE to transmit the model parameter information or the combination based at least in part on the rule.

Some aspects described herein relate to a non-transitory computer-readable medium that stores a set of instructions for wireless communication by a UE. The set of instructions, when executed by one or more processors of the UE, may cause the UE to receive configuration information that includes a rule for transmitting model parameter information associated with a model for predicting an L1 measurement or for transmitting a combination of the model parameter information and an L1 measurement report. The set of instructions, when executed by one or more processors of the UE, may cause the UE to transmit the model parameter information or the combination based at least in part on the rule.

Some aspects described herein relate to a non-transitory computer-readable medium that stores a set of instructions for wireless communication by a network entity. The set of instructions, when executed by one or more processors of the network entity, may cause the network entity to transmit configuration information that includes a rule for transmitting model parameter information associated with a model for predicting an L1 measurement or for transmitting a combination of the model parameter information and an L1 measurement report. The set of instructions, when executed by one or more processors of the network entity, may cause the network entity to receive the model parameter information or the combination based at least in part on the rule.

Some aspects described herein relate to an apparatus for wireless communication. The apparatus may include means for receiving configuration information that includes a rule for transmitting model parameter information associated with a model for predicting an L1 measurement or for transmitting a combination of the model parameter information and an L1 measurement report. The apparatus may include means for transmitting the model parameter information or the combination based at least in part on the rule.

Some aspects described herein relate to an apparatus for wireless communication. The apparatus may include means for receiving configuration information that includes a rule for transmitting model parameter information associated with a model for predicting an L1 measurement or for transmitting a combination of the model parameter information and an L1 measurement report. The apparatus may include means for transmitting the model parameter information or the combination based at least in part on the rule.

Some aspects described herein relate to an apparatus for wireless communication. The apparatus may include means for transmitting configuration information that includes a rule for transmitting model parameter information associated with a model for predicting an L1 measurement or for transmitting a combination of the model parameter information and an L1 measurement report. The apparatus may include means for receiving the model parameter information or the combination based at least in part on the rule.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
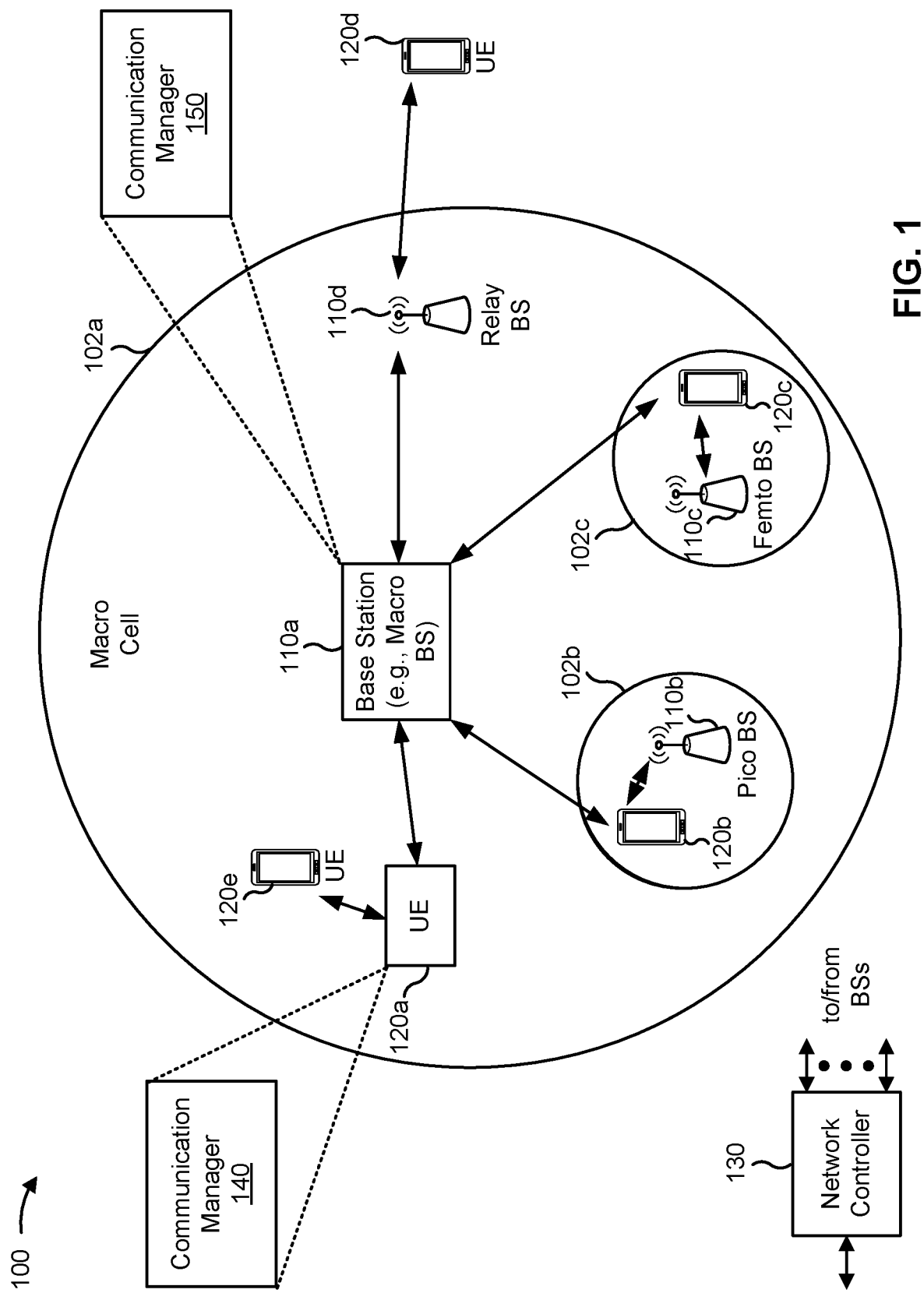
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity"

may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information that includes a rule for transmitting model parameter information associated with a model for predicting a Layer 1 (L1) measurement or for transmitting a combination of the model parameter information and an L1 measurement report. The communication manager 140 may transmit the model parameter information or the combination based at least in part on the rule. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit configuration information that includes a rule for transmitting model parameter information associated with a model for predicting an L1 measurement or for transmitting a combination of the model parameter information and an L1 measurement report. The communication manager 150 may receive the model parameter information or the combination based at least in part on the rule. Additionally, or alternatively, the communication manager 150 may perform one or more other operations described herein.

As indicated above, FIG. 1 is provided as an example. Other examples may differ from what is described with regard to FIG. 1.

Figure 2:
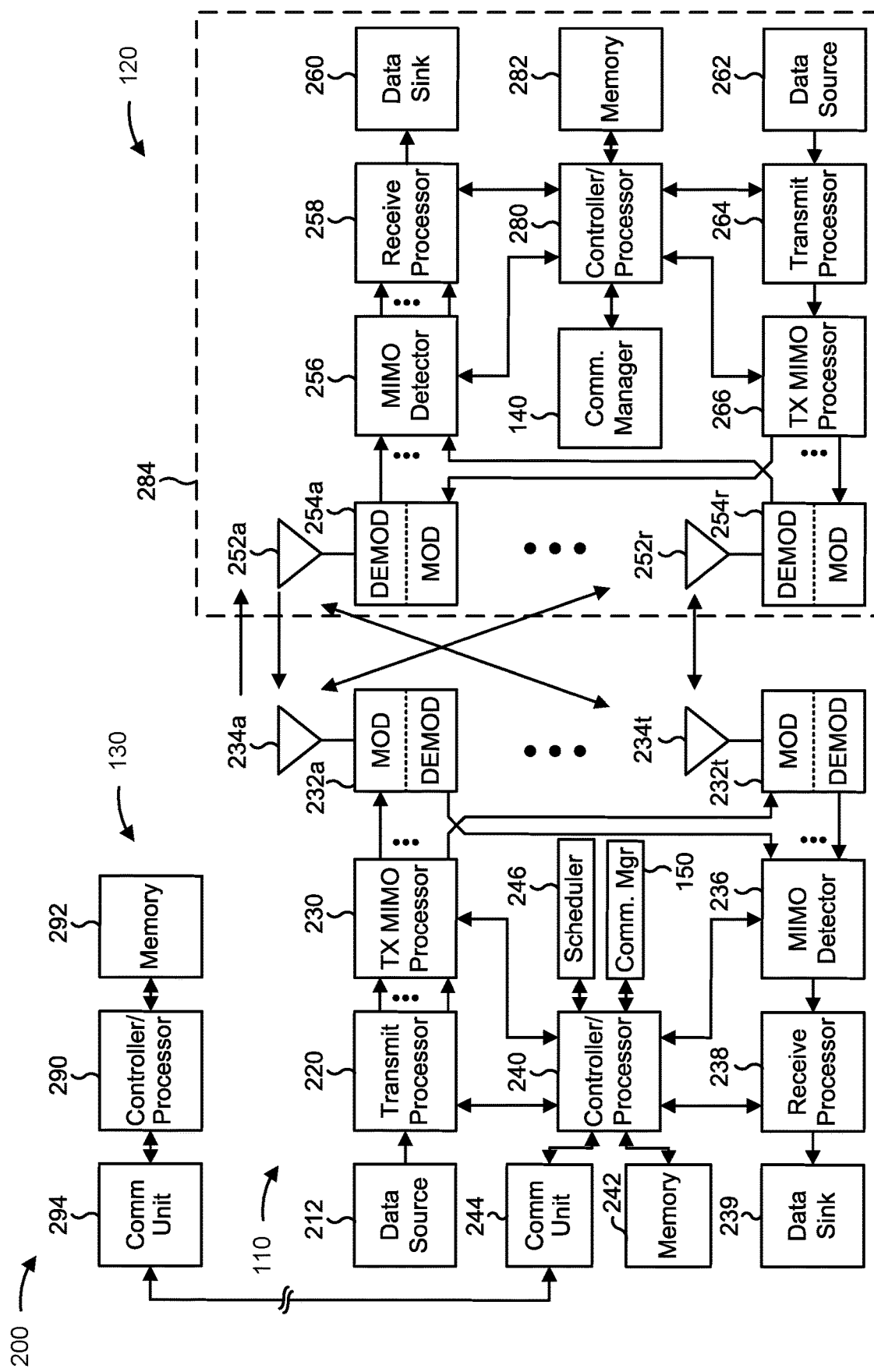
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas ($T \geq 1$). The UE 120 may be equipped with a set of antennas 252a through 252r, such as R antennas ($R \geq 1$).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

A controller/processor of a network entity (e.g., the controller/processor 240 of the base station 110), the controller/processor 280 of the UE 120, and/or any other component(s) of FIG. 2 may perform one or more techniques associated with transmitting model parameter information and/or L1 measurement reports based on a rule, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving configuration information that includes a rule for transmitting model parameter information associated with a model for predicting an L1 measurement or for transmitting a combination of the model parameter information and an L1 measurement report (e.g., using antenna 252, DEMOD 254, MIMO detector 256, receive processor 258, controller/processor 280, memory 282); and/or means for transmitting the model parameter information or the combination based at least in part on the rule (e.g., using antenna 252, DEMOD 254, MIMO detector 256, receive processor 258, controller/processor 280, memory 282). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting configuration information that includes a rule for transmitting model parameter information associated with a model for predicting an L1 measurement or for transmitting a combination of the model parameter information and an L1 measurement report (e.g., using antenna 252, DEMOD 254, MIMO detector 256, receive processor 258, controller/processor 280, memory 282); and/or means for receiving the model parameter information or the combination based at least in part on the rule (e.g., using antenna 252, DEMOD 254, MIMO detector 256, receive processor 258, controller/processor 280, memory 282). In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
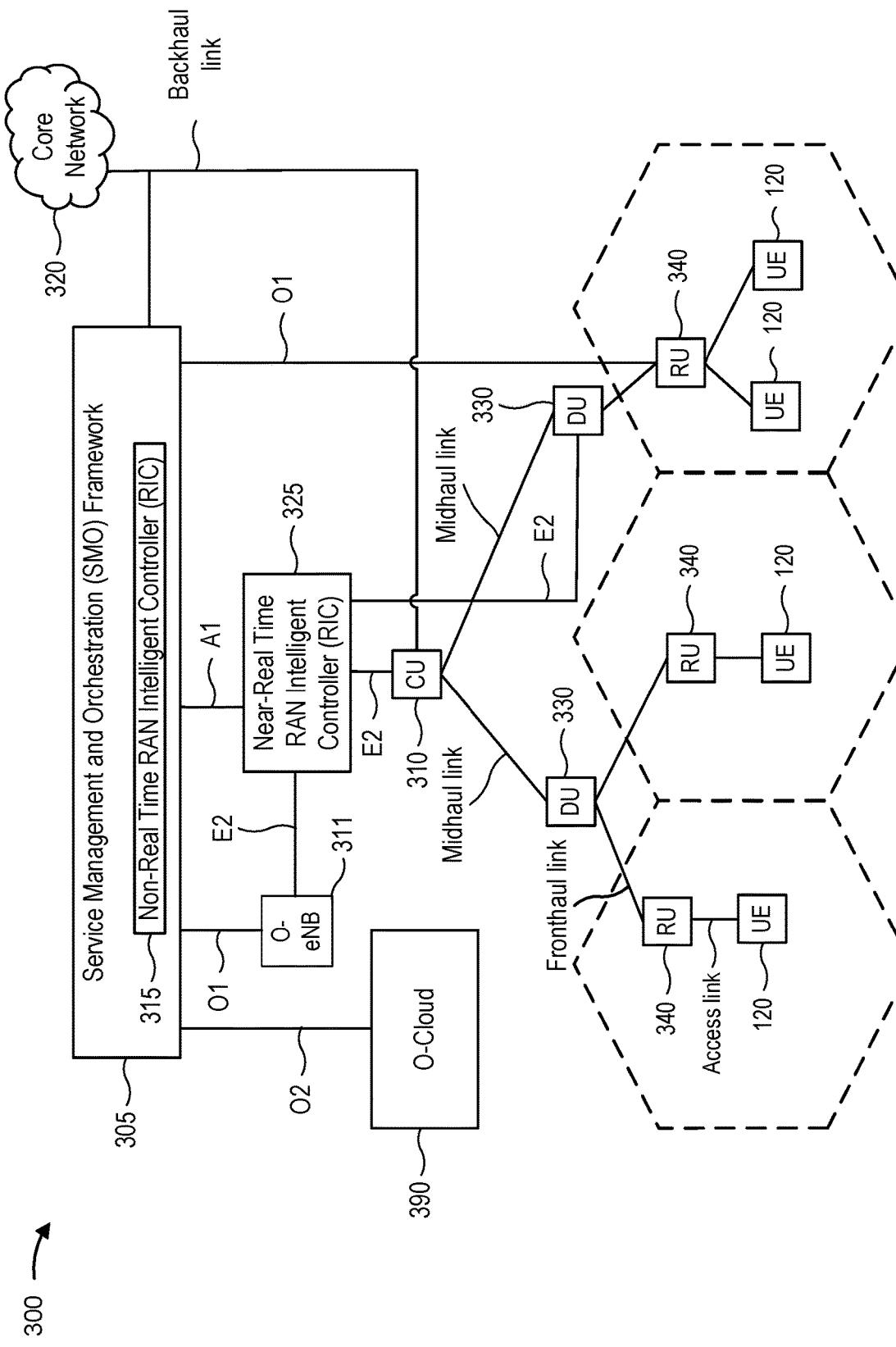
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
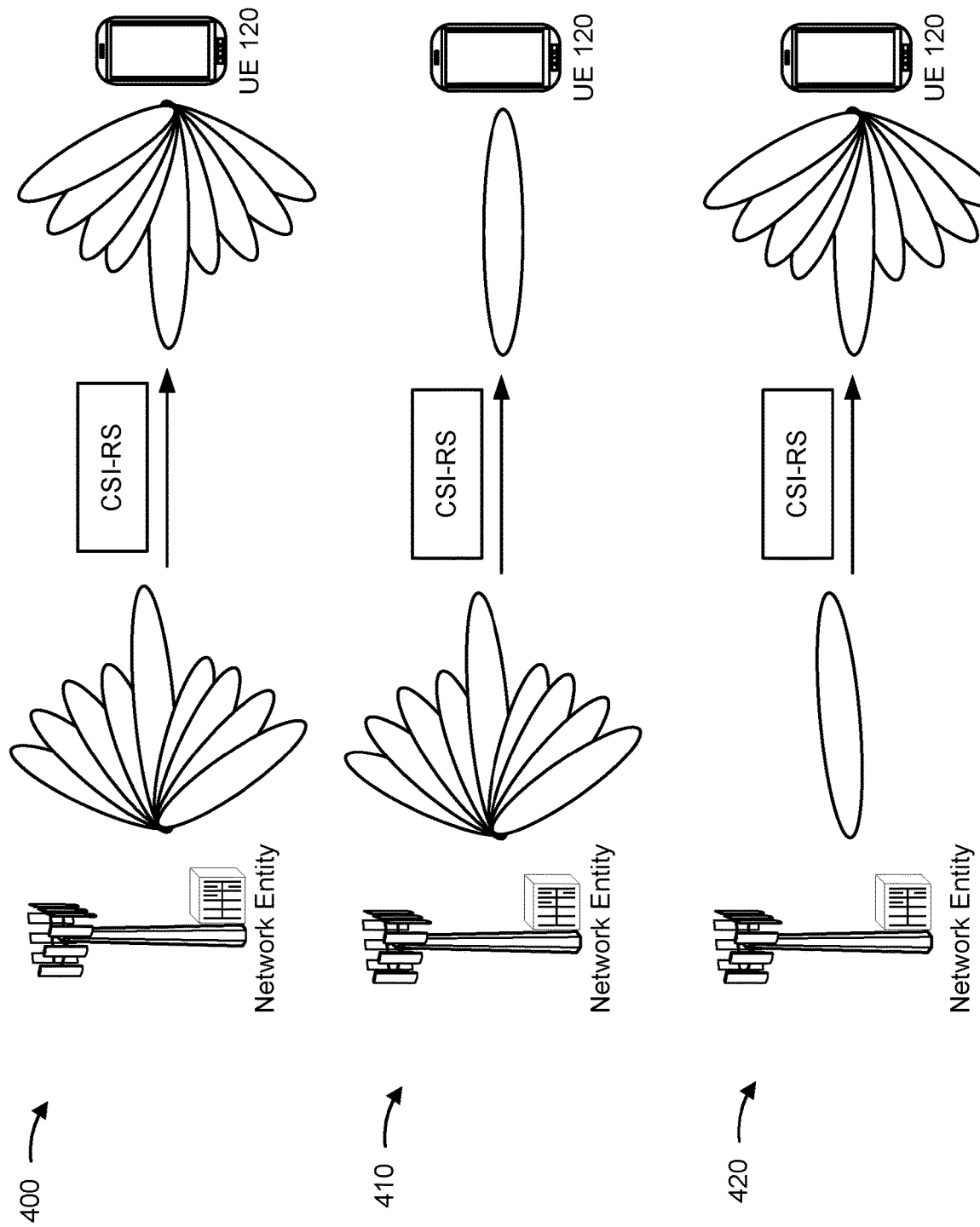
FIG. 4 is a diagram illustrating examples of beam management procedures, in accordance with the present disclosure.

FIG. 4 is a diagram illustrating examples 400, 410, and 420 of beam management procedures, in accordance with the present disclosure. As shown in FIG. 4, examples 400, 410, and 420 include a UE 120 in communication with a network entity (e.g., base station 110) in a wireless network (e.g., wireless network 100). However, the devices shown in FIG. 4 are provided as examples, and the wireless network may support communication and beam management between other devices (e.g., between a UE 120 and a network entity or TRP, between a mobile termination node and a control node, between an integrated access and backhaul (IAB) child node and an IAB parent node, and/or between a scheduled node and a scheduling node). In some aspects, the UE 120 and the network entity may be in a connected state (e.g., a radio resource control (RRC) connected state).

As shown in FIG. 4, example 400 may include a network entity (e.g., one or more network node devices such as an RU, a DU, and/or a CU, among other examples) and a UE 120 communicating to perform beam management using, for example, channel state information reference signals (CSI-RSs). Measurements may be performed with non-zero power (NZP) CSI-RSs, synchronization signal blocks (SSBs), or CSI interference measurement (CSI-IM) resources. Measurement values may include, for example, an L1-RSRP and/or an L1 signal-to-interference-plus-noise ratio (SINR).

The UE 120 may be configured with one or more CSI resource settings (CSI-ResourceConfig), and a parameter (e.g., reportQuantity) may indicate CSI-related, L1-RSRP-related, or L1-SINR-related quantities to report. CSI report settings may be linked to the CSI resource settings. Each trigger state for aperiodic triggering may include a list of associated CSI-ReportConfigs indicating the resource set identifiers (IDs) for channel measurements and/or for interference measurements. Each trigger state for semi-persistent triggering may include one associated CSI-ReportConfig.

Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 4 and example 400, CSI-RSs may be configured to be transmitted from the network entity to the UE 120. The CSI-RSs may be configured to be periodic (e.g., using RRC signaling), semi-persistent (e.g., using media access control (MAC) control element (MAC-CE) signaling), and/or aperiodic (e.g., using downlink control information (DCI)). For example, periodic reporting may include measuring periodic CSI-RSs and transmitting a report on a physical uplink shared channel (PUSCH). Semi-periodic reporting may include measuring periodic CSI-RSs or semi-persistent CSI-RSs and transmitting a report on a physical uplink control channel (PUCCH) via activation by a MAC CE or on a PUSCH via triggering by DCI. Aperiodic reporting may include measuring periodic CSI-RSs, semi-persistent CSI-RSs, and/or aperiodic CSI-RSs (e.g., triggered by DCI) and transmitting a report on a PUCCH.

L1-RSRP measurements may be configured with a resource setting, with up to 16 CSI-RS resource sets (up to 64 resources within each set) for a maximum total of 128 CSI-RS resources. L1-SINR measurements may be configured with a resource setting with up to 64 CSI-RS resources or up to 64 SSBs. L1-SINR combinations may include combinations of channel measurement resources (CMRs) and interference measurement resources (IMRs). For example, a first combination may include an NZP CSI-RS as a CMR and as an IMR. A second combination may include an SSB as a CMR and a zero-power (ZP) CSI-RS as an IMR. A third combination may include an SSB as a CMR and an NZP CSI-RS as an IMR. A fourth combination may include an NZP CSI-RS as a CMR and a ZP CSI-RS as an IMR. A fifth combination may include an NZP CSI-RS as a CMR and another NZP CSI-RS as an IMR.

The first beam management procedure may include the network entity performing beam sweeping over multiple transmit (Tx) beams. The network entity may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network entity has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network entity, the UE 120 may perform beam sweeping through the receive beams of the UE 120. As a result, the first beam management procedure may enable the UE 120 to measure a CSI-RS on different transmit beams using different receive beams to support selection of network entity transmit beams/UE 120 receive beam(s) beam pair(s). The UE 120 may report the measurements to the network entity to enable the network entity to select one or more beam pair(s) for communication between the network entity and the UE 120. While example 400 has been described in connection with CSI-RSs, the first beam management process may also use SSBs for beam management in a similar manner as described above.

As shown in FIG. 4, example 410 may include a network entity and a UE 120 communicating to perform beam management using CSI-RSs. Example 410 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 4 and example 410, CSI-RSs may be configured to be transmitted from the network entity to the UE 120. The CSI-RSs may be configured to be aperiodic (e.g., using DCI). The second beam management procedure may include the network entity performing beam sweeping over one or more transmit beams. The one or more transmit beams may be a subset of all transmit beams associated with the network entity (e.g., determined based at least in part on measurements reported by the UE 120 in connection with the first beam management procedure). The network entity may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network entity to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network entity to the UE 120. The CSI-RSs may be configured to be aperiodic (e.g., using DCI). The third beam management process may include the network entity transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network entity may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network entity and/or the UE 120 to select a best receive beam based at least in part on reported measurements received from the UE 120 (e.g., of the CSI-RS of the transmit beam using the one or more receive beams).

The UE 120 may perform group-based beam reporting to account for beams that the UE 120 can receive simultaneously on multiple antenna panels. Multiple reflected transmit beams may be received using the same UE panel. Group-based beam reporting may enable the network entity to transmit data on two beams or to switch transmit beams without delay, within the beam group.

If group-based beam reporting is disabled, the UE 120 may report multiple different CSI-RS resource indicators (CRIs) or SSB resource indicators (SSBRIs) for each report setting. The largest measured value may be quantized to 7 bits. Other measurements may be differentials with respect to the largest measured value and quantized to 4-bits. For example, if group-based reporting is disabled with 4 measurements per report setting, 4 values may be reported: CRI 1 for a highest measurement value (measurement 1), a first differential for CRI 2 (measurement 2), a second differential for CRI 3 (measurement 3), and a third differential for CRI 4 (measurement 4). If group-based beam reporting is enabled, the UE 120 may report two different CRIs or SSBRIs for each report setting. For example, if group-based beam reporting is enabled, a first setting may include a highest measured value for CRI 1 (measurement 1) and a differential for CRI 2 (measurement 2). A second setting may include a highest measured value for CRI 1 (measurement 1) and a differential for CRI 2 (measurement 2). A timing parameter (e.g., beamReportTiming) may indicate a time between a downlink reference signal (e.g., SSB or CSI-RS) and a beam report on the uplink.

Depending on multiple factors (e.g., speed of the UE, report periodicity), the UE 120 may transmit multiple L1 measurement reports before an actual beam switch occurs (e.g., 65% of the time). Depending on the number of reference signals in the report and the number of settings, the L1 report payload can be large and cause considerable overhead and beam direction reservations (since the network entity is to make sure that beam is used at the L1 report time). Networks may filter these reports. However, event-based reporting may not be optimal for network configurations.

As indicated above, FIG. 4 is provided as an example of beam management procedures. Other examples of beam management procedures may differ from what is described with respect to FIG. 4. For example, the UE 120 and the network entity may perform the third beam management procedure before performing the second beam management procedure, and/or the UE 120 and the network entity may perform a similar beam management procedure to select a UE transmit beam.

Figure 5:
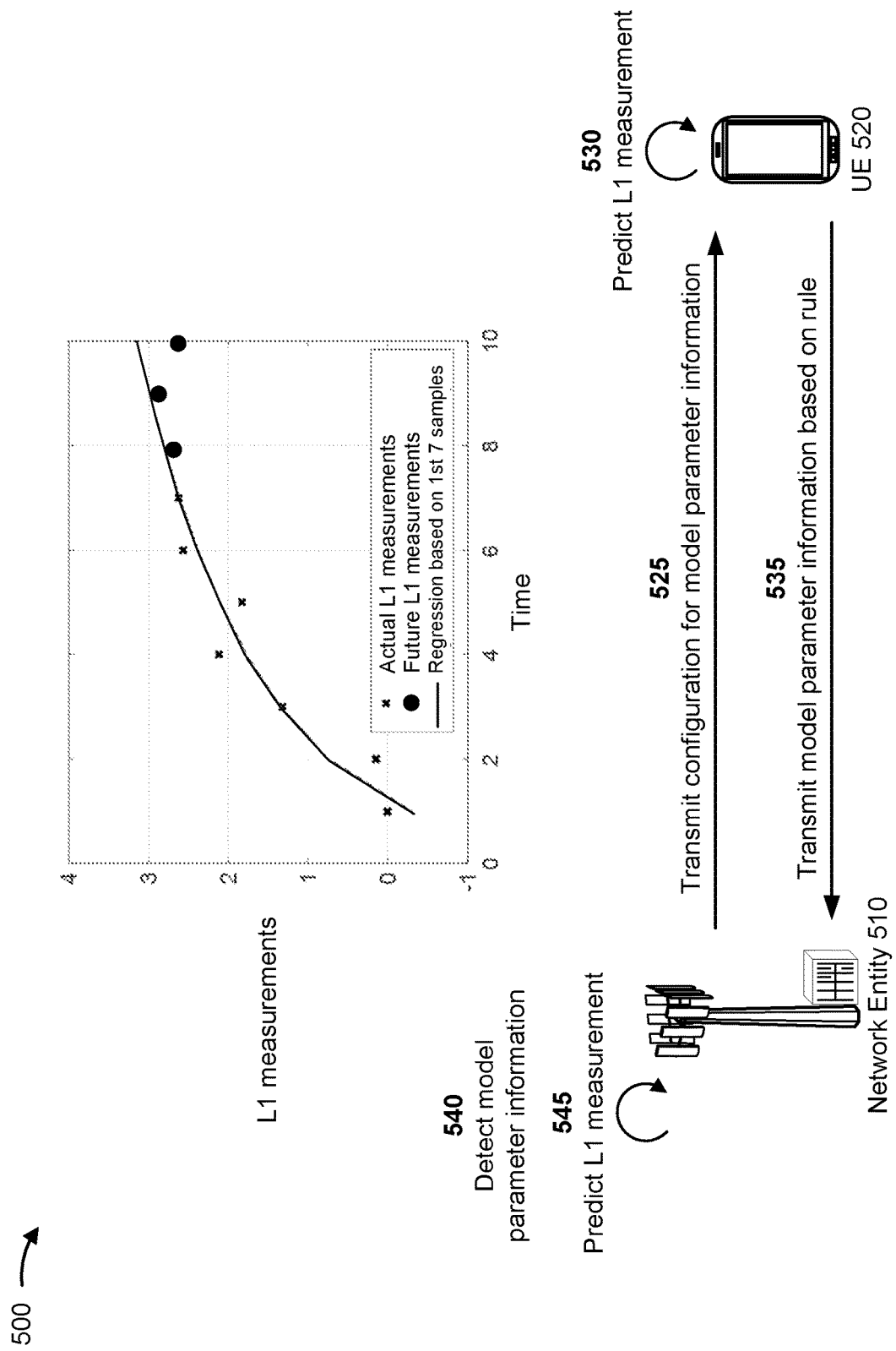
FIG. 5 is a diagram illustrating an example of transmitting model parameter information based on a rule, in accordance with the present disclosure.

FIG. 5 is a diagram illustrating an example 500 of transmitting model parameter information based on a rule, in accordance with the present disclosure. As shown in FIG. 5, network entity 510 (e.g., a base station 110) and a UE 520 (e.g., a UE 120) may communicate with one another via a wireless network (e.g., wireless network 100).

According to various aspects described herein, the UE 520 may use a new L1 measurement report type that includes model parameterizations of L1 measurements rather than actual L1 measurements. For example, a model may be generated by design or machine learning that represents a prediction of future L1 measurements. The model may use parameter values to predict the future L1 measurements based on past L1 measurements or model parameter values. Therefore, rather than transmitting actual L1 measurements, a receiving entity (e.g., network entity 510) may use model parameter information (e.g., one or more model parameter values) received from the UE 520 to predict future L1 measurements for one or more future time occasions for reporting. As a result, the UE 520 and the network entity 510 may conserve signaling resources and reduce latency.

In some aspects, model parameters may include slope parameters that are based on past and/or predicted L1 measurements. Model parameters may include a linear regression parameter, a non-linear regression parameter, and/or fit parameters of L1 measurements. Model parameters may include parameters that are based on machine learning prediction. The machine learning models may be trained using past L1 measurements and/or past predictions of L1 measurements (including how predictions compare to actual measurements). A model parameter may include a trend of L1 measurements (e.g., increasing or decreasing in value). For example, the model parameter information may include a rate of increase or a rate of decrease of values of L1 measurements based at least in part on past L1 measurements. Model parameters may include other statistical parameters, such as a mean, a standard deviation, and/or a variance value.

Example 500 shows a diagram of 10 time occasions for reporting L1 measurements. Actual L1 measurements are reported for the first 7 time occasions, and L1 measurements are predicted for the last 3 time occasions. At the $7^{th}$ time or $8^{th}$ time occasion, or an earlier time occasion, instead of a regular L1 measurement report, the UE 520 may transmit model parameter information. The model parameter information may include, for example, fit parameters a and b (e.g., a=−0.3, b=3.5). The network entity 510 may use a model to predict L1 measurement values using $a+(b \times \log_{10}(\text{time}))$. In this way, the network entity 510 may predict the last three L1 measurements.

Example 500 shows that the network entity 510 may configure the UE 520 with a rule that specifies how and/or when to report model parameter information and/or L1 measurements. The UE 520 may provide recommendations for rules. As shown by reference number 525, the network entity 510 may transmit a configuration for model parameter information. The configuration may specify a model associated with the model parameter information, parameters associated with the model parameter information, information specifying how to use the model parameter information, or a combination thereof. The configuration may include one or more rules for when to transmit model parameter information or a combination of model parameter information and L1 measurements and when to transmit a regular L1 measurement report.

In some aspects, a rule may specify that an L1 measurement report is to be transmitted if a difference between a first value predicted by the model parameter information and a second value of the L1 measurement report does not satisfy a minimum difference threshold (e.g., minimum decibel (dB) value). For example, if there is little difference between a predicted value and an actual value, the actual value may be reported. A rule may specify that the L1 measurement report is to be transmitted instead of the model parameter information based at least in part on a beam failure detection. A rule may specify that the L1 measurement report is to be transmitted instead of the model parameter information based at least in part on the L1 measurement not satisfying a measurement threshold (e.g., minimum dB value). For example, if there is a large L1 measurement value, the L1 measurement may be reported.

In some aspects, a rule may specify that the L1 measurement report is to be transmitted instead of the model parameter information based at least in part on a payload size of the L1 measurement report not satisfying a payload size threshold (e.g., minimum quantity of bits). By contrast, the model parameter information may be transmitted if the payload size of the L1 measurement report satisfies the payload size threshold. For example, if the L1 measurement payload is not too large, the UE 520 may transmit the L1 measurement report. If the L1 measurement payload is too large, the UE 520 may transmit the model parameter information instead of the L1 measurement report. In some aspects, the UE 520 may optionally predict an L1 measurement, as shown by reference number 530, in order to comply with a rule.

As shown by reference number 535, the UE 520 may transmit model parameter information based at least in part on the rule. As shown by reference number 540, the network entity 510 may detect the model parameter information, either by indication or implication. For example, the network entity 510 may receive a report and detect that the report includes model parameter information based at least in part on a sequence in the report. For example, the network entity 510 may detect the model parameter information based at least in part on a DMRS of an uplink channel (PUSCH or PUCCH). The network entity 510 may detect the model parameter information based at least in part on a quantity of resource blocks (RBs) that are used for a model-based report. For example, for PUCCH formats with more than one RB, a model-based report may use a different quantity of RBs. The network entity 510 may detect the model parameter information based at least in part on a quantity of symbols that are used for a model-based report. For example, for PUCCH formats with more than one symbol, a model-based report may use a different quantity of symbols. The network entity 510 may detect the model parameter information based at least in part on the model parameter information having a PUCCH format that is configured for model parameter information (different than a PUCCH format for L1 measurement reports).

The UE 520 may multiplex the model parameter information with an uplink message. For example, the UE 520 may piggyback the model parameter information on an existing uplink message (e.g., MAC CE in a configured grant resource). The network entity 510 may detect the model parameter information in the multiplexed message.

As shown by reference number 545, the network entity 510 may predict L1 measurements. An L1 measurement prediction may be based at least in part on a model and one or more parameters. Values for the one or more parameters may be based at least in part on the model parameter information.

As indicated above, FIG. 5 is provided as an example. Other examples may differ from what is described with respect to FIG. 5.

Figure 6:
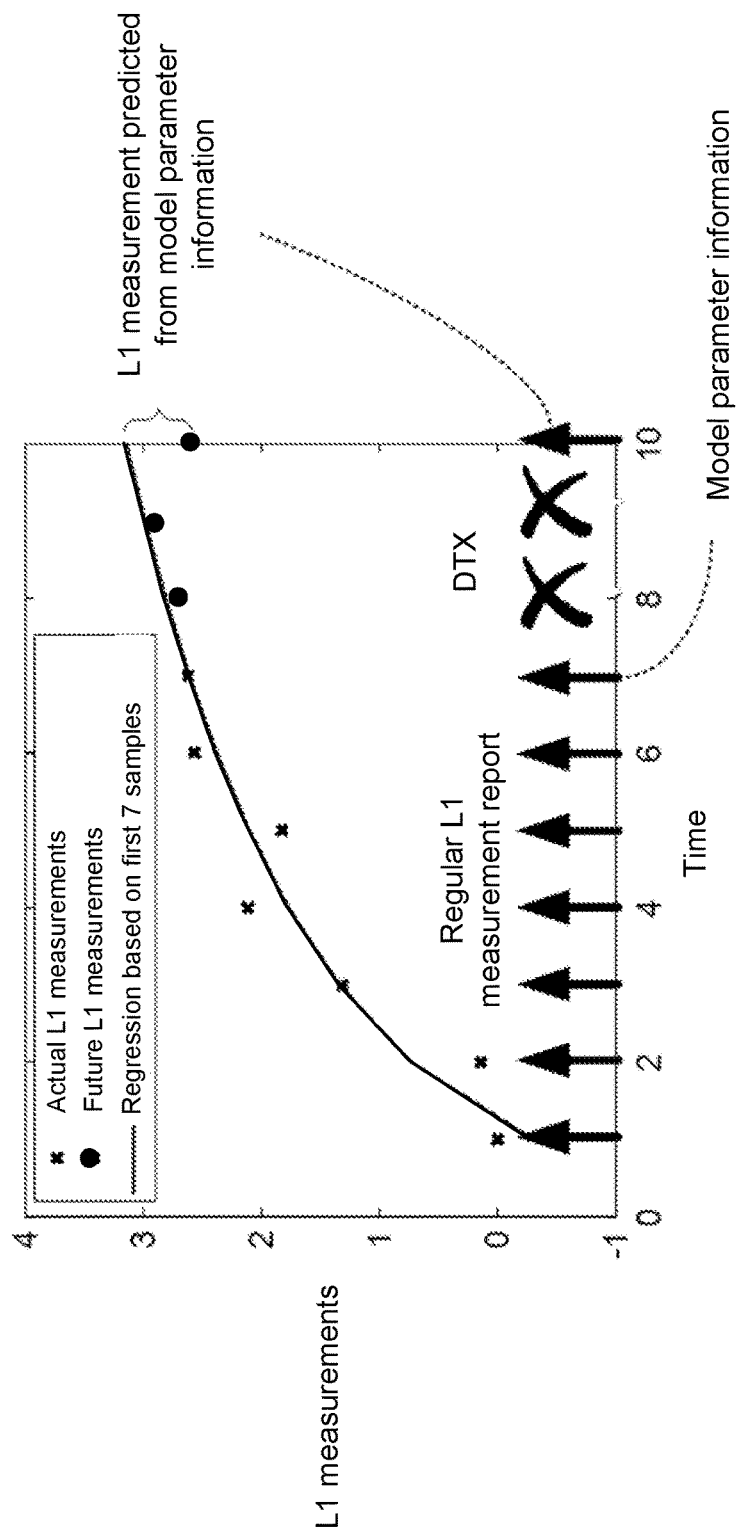
FIG. 6 is a diagram illustrating an example of time occasions for reporting measurements, in accordance with the present disclosure.

FIG. 6 is a diagram illustrating an example 600 of time occasions for reporting measurements, in accordance with the present disclosure.

Example 600 shows 10 time occasions for reporting L1 measurements. The UE 520 may transmit a regular L1 measurement report for the first 6 or 7 time occasions. The UE 520 may transmit model parameter information at the $7^{th}$ time occasion. Nothing is transmitted for the $8^{th}$ and $9^{th}$ time occasions, as part of a discontinuous transmission (DTX) time period. At the $8^{th}$, $9^{th}$, and/or $10^{th}$ time occasion, the network entity 510 may predict L1 measurements. The network entity 510 may configure the UE 520 with a rule that specifies what report (e.g., measurement report or model-based report) is transmitted at certain time occasions. For example, a rule may specify that the model parameter information or a combination of model parameter information and L1 measurements are to be transmitted after transmitting L1 measurement reports at each of a configured quantity of time occasions for reporting (reporting instances). In example 600, the configured quantity is 6 or 7 time occasions.

In some aspects, a rule may specify that an L1 measurement report is to be transmitted after transmitting parameter information or a combination of model parameter information and an L1 measurement report at each of a configured quantity of reporting instances. For example, the UE 520 may transmit model parameter information for three time occasions ($8^{th}$, $9^{th}$, and $10^{th}$ time occasions) but after three time occasions of reporting model parameter information, the UE 520 is configured to transmit a specified quantity of regular L1 measurement reports.

In some aspects, a rule may specify that an L1 measurement report is to be transmitted a configured quantity of empty reporting instances (DTX) after transmitting the model parameter information. For example, the UE 520 may skip all reporting for a specified quantity of time occasions.

By configuring the UE 520 with specific time occasions for L1 measurements, model parameter information, or the combination thereof, the network entity 510 may control the use of signaling resources for L1 measurement reporting and prediction, as part of more effective beam management.

As indicated above, FIG. 6 is provided as an example. Other examples may differ from what is described with regard to FIG. 6.

Figure 7:
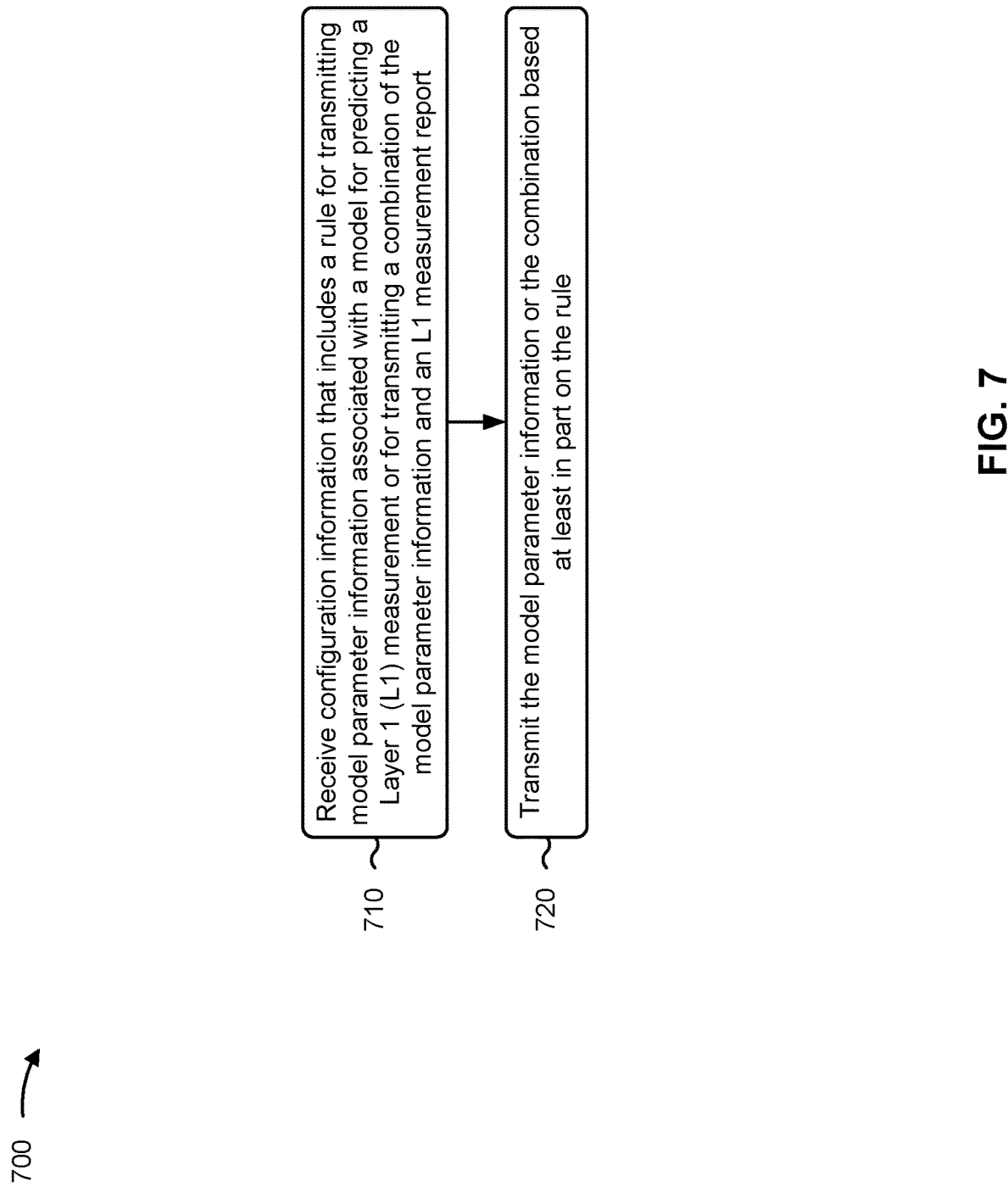
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120, UE 520) performs operations associated with reporting model parameter information for L1 measurement prediction.

As shown in FIG. 7, in some aspects, process 700 may include receiving configuration information that includes a rule for transmitting model parameter information associated with a model for predicting an L1 measurement or for transmitting a combination of the model parameter information and an L1 measurement report (block 710). For example, the UE (e.g., using communication manager 908 and/or reception component 902 depicted in FIG. 9) may receive configuration information that includes a rule for transmitting model parameter information associated with a model for predicting an L1 measurement or for transmitting a combination of the model parameter information and an L1 measurement report, as described above with reference to FIGS. 4-6.

As further shown in FIG. 7, in some aspects, process 700 may include transmitting the model parameter information or the combination based at least in part on the rule (block 720). For example, the UE (e.g., using communication manager 908 and/or transmission component 904 depicted in FIG. 9) may transmit the model parameter information or the combination based at least in part on the rule, as described above with reference to FIGS. 4-6.

Process 700 may include additional aspects, such as any single aspect or any combination of aspects described below and/or in connection with one or more other processes described elsewhere herein.

In a first aspect, the rule specifies when to transmit the model parameter information or the combination and when to transmit an L1 measurement report.

In a second aspect, alone or in combination with the first aspect, the rule specifies that the model parameter information or the combination is to be transmitted after transmitting L1 measurement reports at each of a configured quantity of reporting instances.

In a third aspect, alone or in combination with one or more of the first and second aspects, the rule specifies that an L1 measurement report is to be transmitted after transmitting parameter information or a combination of model parameter information and an L1 measurement report at each of a configured quantity of reporting instances.

In a fourth aspect, alone or in combination with one or more of the first through third aspects, the rule specifies that an L1 measurement report is to be transmitted a configured quantity of empty reporting instances after transmitting the model parameter information.

In a fifth aspect, alone or in combination with one or more of the first through fourth aspects, the rule specifies that the L1 measurement report is to be transmitted if a difference between a first value predicted by the model parameter information and a second value of the L1 measurement report does not satisfy a minimum difference threshold.

In a sixth aspect, alone or in combination with one or more of the first through fifth aspects, the rule specifies that the L1 measurement report is to be transmitted instead of the model parameter information based at least in part on a beam failure detection.

In a seventh aspect, alone or in combination with one or more of the first through sixth aspects, the rule specifies that the L1 measurement report is to be transmitted instead of the model parameter information based at least in part on the L1 measurement not satisfying a measurement threshold.

In an eighth aspect, alone or in combination with one or more of the first through seventh aspects, the rule specifies that the L1 measurement report is to be transmitted instead of the model parameter information based at least in part on a payload size of the L1 measurement report not satisfying a payload size threshold, and the model parameter information is transmitted if the payload size of the L1 measurement report satisfies the payload size threshold.

In a ninth aspect, alone or in combination with one or more of the first through eighth aspects, the configuration specifies a model associated with the model parameter information, parameters associated with the model parameter information, information specifying how to use the model parameter information, or a combination thereof.

In a tenth aspect, alone or in combination with one or more of the first through ninth aspects, the model parameter information includes one or more slope parameters indicating a rate of increase or a rate of decrease of values of L1 measurements based at least in part on past L1 measurements, predicted L1 measurements, or a combination thereof.

In an eleventh aspect, alone or in combination with one or more of the first through tenth aspects, the model parameter information includes a linear regression parameter, a non-linear regression parameter, a fit parameter, or a combination thereof for predicting the L1 measurement based at least in part on past L1 measurements, predicted L1 measurements, or a combination thereof.

In a twelfth aspect, alone or in combination with one or more of the first through eleventh aspects, the model parameter information includes one or more machine learning parameters for predicting the L1 measurement based at least in part on past L1 measurements, predicted L1 measurements, or a combination thereof.

In a thirteenth aspect, alone or in combination with one or more of the first through twelfth aspects, the model parameter information includes a trending parameter for predicting the L1 measurement based at least in part on past L1 measurements, predicted L1 measurements, or a combination thereof.

In a fourteenth aspect, alone or in combination with one or more of the first through thirteenth aspects, the model parameter information includes a mean value, a standard deviation, a variance of L1 measurements for predicting the L1 measurement, or a combination thereof based at least in part on past L1 measurements, predicted L1 measurements, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
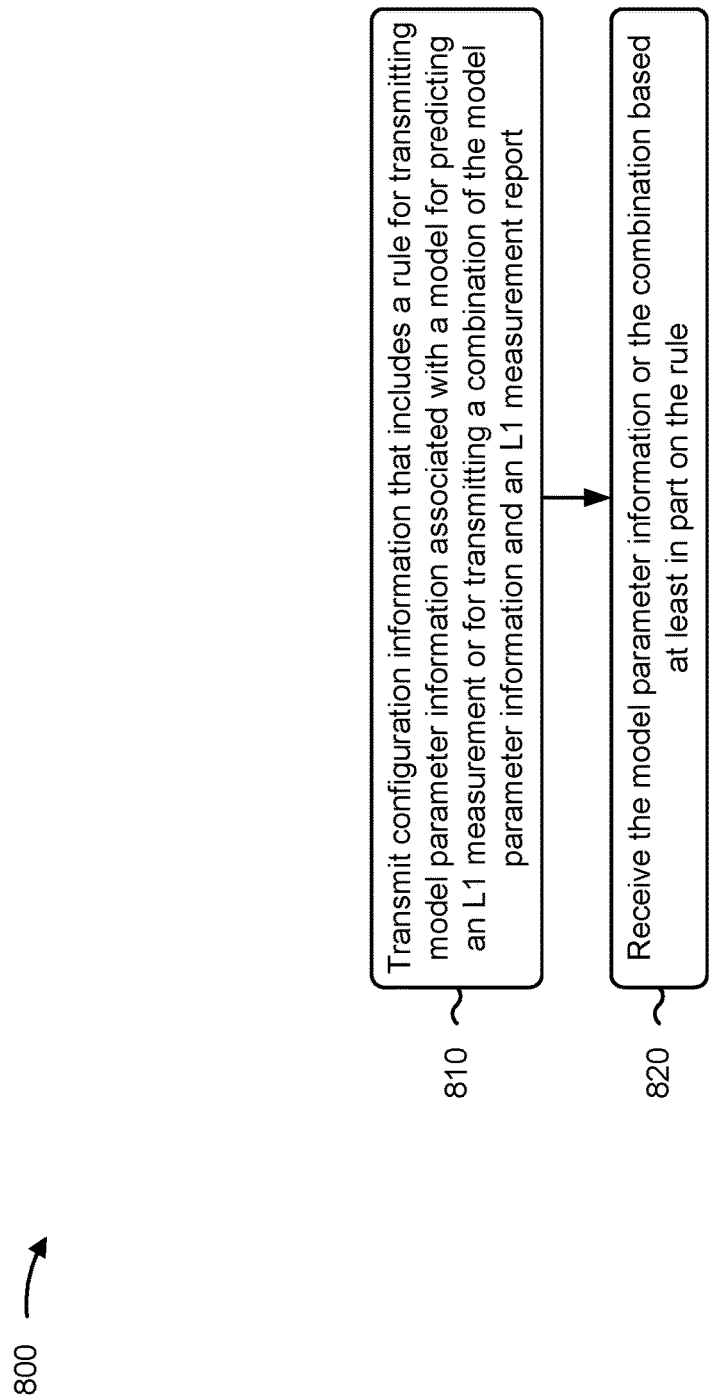
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., network entity 510) performs operations associated with configuring a UE for reporting model parameter information for L1 measurement prediction.

As shown in FIG. 8, in some aspects, process 800 may include transmitting configuration information that includes a rule for transmitting model parameter information associated with a model for predicting an L1 measurement or for transmitting a combination of the model parameter information and an L1 measurement report (block 810). For example, the network entity (e.g., using communication manager 1008 and/or transmission component 1004 depicted in FIG. 10) may transmit configuration information that includes a rule for transmitting model parameter information associated with a model for predicting an L1 measurement or for transmitting a combination of the model parameter information and an L1 measurement report, as described above with reference to FIGS. 4-6.

As further shown in FIG. 8, in some aspects, process 800 may include receiving the model parameter information or the combination based at least in part on the rule (block 820). For example, the network entity (e.g., using communication manager 1008 and/or reception component 1002 depicted in FIG. 10) may receive the model parameter information or the combination based at least in part on the rule, as described above with reference to FIGS. 4-6.

Process 800 may include additional aspects, such as any single aspect or any combination of aspects described below and/or in connection with one or more other processes described elsewhere herein.

In a first aspect, the rule specifies when to transmit the model parameter information or the combination and when to transmit an L1 measurement report.

In a second aspect, alone or in combination with the first aspect, process 800 includes detecting the model parameter information based at least in part on a demodulation reference signal of an uplink channel that is configured for model parameter information, the model parameter information being received in a quantity of resource blocks that is configured for model parameter information, the model parameter information being received in a quantity of symbols that is configured for model parameter information, the model parameter information having a physical uplink channel (e.g., PUCCH) format that is configured for model parameter information, the model parameter information being multiplexed with an uplink message, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
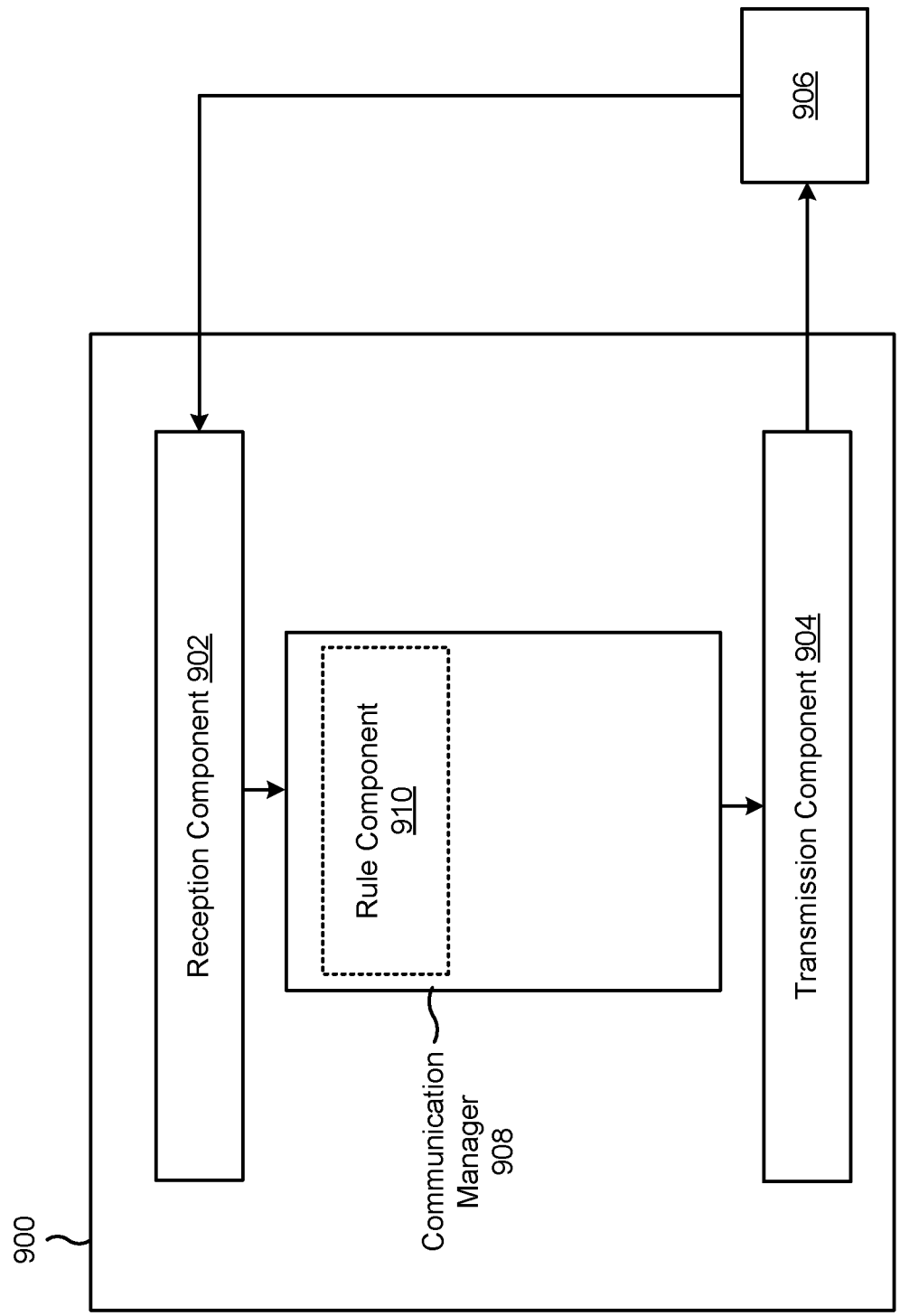
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a UE (e.g., a UE 120, UE 520), or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the UE described in connection with FIG. 2. The communication manager 908 may be, or be similar to, the communication manager 140 depicted in FIGS. 1 and 2. For example, in some aspects, the communication manager 908 may be configured to perform one or more of the functions described as being performed by the communication manager 140. In some aspects, the communication manager 908 may include the reception component 902 and/or the transmission component 904. The communication manager 908 may include a rule component 910, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive configuration information that includes a rule for transmitting model parameter information associated with a model for predicting an L1 measurement or for transmitting a combination of the model parameter information and an L1 measurement report. The rule component 910 may implement the rule. The transmission component 904 may transmit the model parameter information or the combination based at least in part on the rule.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
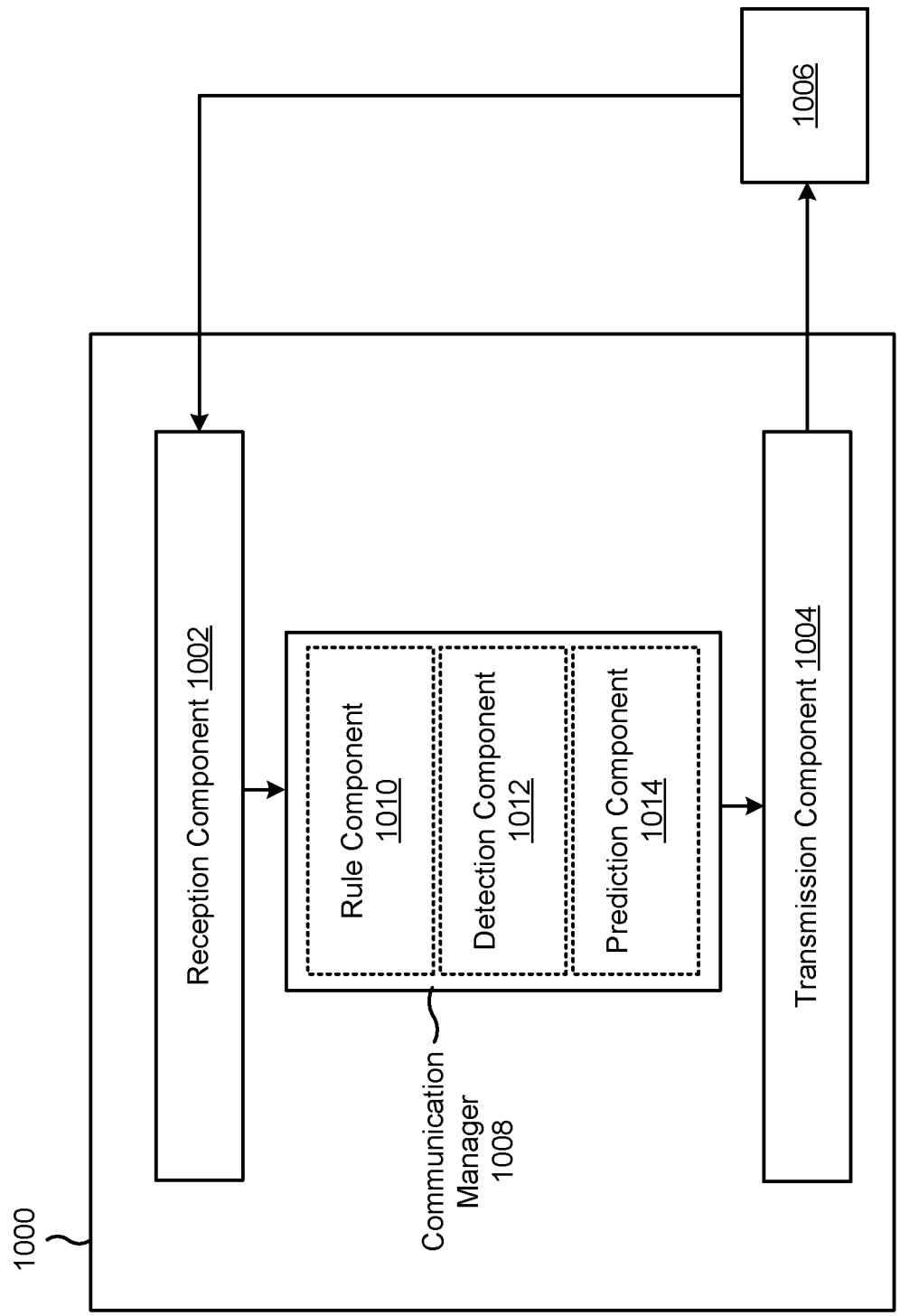

FIG. 10 is a diagram of an example apparatus 1000 for wireless communication, in accordance with the present disclosure. The apparatus 1000 may be a network entity (e.g., base station 110, network entity 510), or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the network entity described in connection with FIG. 2. The communication manager 1008 may be, or be similar to, the communication manager 150 depicted in FIGS. 1 and 2. For example, in some aspects, the communication manager 1008 may be configured to perform one or more of the functions described as being performed by the communication manager 150. In some aspects, the communication manager 1008 may include the reception component 1002 and/or the transmission component 1004. The communication manager 1008 may include a rule component 1010, a detection component 1012, and/or a prediction component 1014, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver.

The transmission component 1004 may transmit configuration information that includes a rule for transmitting model parameter information associated with a model for predicting an L1 measurement or for transmitting a combination of the model parameter information and an L1 measurement report. The rule component 1010 may generate the rule based at least in part on a UE capability for using such rules, traffic conditions, and/or channel conditions. The reception component 1002 may receive the model parameter information or the combination based at least in part on the rule.

The detection component 1012 may detect the model parameter information based at least in part on a demodulation reference signal of an uplink channel that is configured for model parameter information; the model parameter information being received in a quantity of resource blocks that is configured for model parameter information; the model parameter information being received in a quantity of symbols that is configured for model parameter information; the model parameter information having a physical uplink channel format that is configured for model parameter information; the model parameter information being multiplexed with an uplink message; or a combination thereof. The prediction component 1014 may predict L1 measurements based at least in part on a model and the model parameter information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving configuration information that includes a rule for transmitting model parameter information associated with a model for predicting a Layer 1 (L1) measurement or for transmitting a combination of the model parameter information and an L1 measurement report; and transmitting the model parameter information or the combination based at least in part on the rule.

Aspect 2: The method of Aspect 1, wherein the rule specifies when to transmit the model parameter information or the combination and when to transmit an L1 measurement report.

Aspect 3: The method of Aspect 1 or 2, wherein the rule specifies that the model parameter information or the combination is to be transmitted after transmitting L1 measurement reports at each of a configured quantity of reporting instances.

Aspect 4: The method of Aspect 1 or 2, wherein the rule specifies that an L1 measurement report is to be transmitted after transmitting parameter information or a combination of model parameter information and an L1 measurement report at each of a configured quantity of reporting instances.

Aspect 5: The method of Aspect 1 or 2, wherein the rule specifies that an L1 measurement report is to be transmitted a configured quantity of empty reporting instances after transmitting the model parameter information.

Aspect 6: The method of any of Aspects 1-5, wherein the rule specifies that the L1 measurement report is to be transmitted if a difference between a first value predicted by the model parameter information and a second value of the L1 measurement report does not satisfy a minimum difference threshold.

Aspect 7: The method of Aspect 1 or 2, wherein the rule specifies that the L1 measurement report is to be transmitted instead of the model parameter information based at least in part on a beam failure detection.

Aspect 8: The method of Aspect 1 or 2, wherein the rule specifies that the L1 measurement report is to be transmitted instead of the model parameter information based at least in part on the L1 measurement not satisfying a measurement threshold.

Aspect 9: The method of Aspect 1 or 2, wherein the rule specifies that the L1 measurement report is to be transmitted instead of the model parameter information based at least in part on a payload size of the L1 measurement report not satisfying a payload size threshold, and wherein the model parameter information is transmitted if the payload size of the L1 measurement report satisfies the payload size threshold.

Aspect 10: The method of any of Aspects 1-9, wherein the configuration specifies a model associated with the model parameter information, parameters associated with the model parameter information, information specifying how to use the model parameter information, or a combination thereof.

Aspect 11: The method of any of Aspects 1-10, wherein the rule specifies when to transmit the model parameter information or the combination and when to transmit an L1 measurement report.

Aspect 12: The method of any of Aspects 1-11, wherein the model parameter information includes one or more slope parameters indicating a rate of increase or a rate of decrease of values of L1 measurements based at least in part on past L1 measurements, predicted L1 measurements, or a combination thereof.

Aspect 13: The method of any of Aspects 1-12, wherein the model parameter information includes a linear regression parameter, a non-linear regression parameter, a fit parameter, or a combination thereof for predicting the L1 measurement based at least in part on past L1 measurements, predicted L1 measurements, or a combination thereof.

Aspect 14: The method of any of Aspects 1-13, wherein the model parameter information includes one or more machine learning parameters for predicting the L1 measurement based at least in part on past L1 measurements, predicted L1 measurements, or a combination thereof.

Aspect 15: The method of any of Aspects 1-14, wherein the model parameter information includes a trending parameter for predicting the L1 measurement based at least in part on past L1 measurements, predicted L1 measurements, or a combination thereof.

Aspect 16: The method of any of Aspects 1-15, wherein the model parameter information includes a mean value, a standard deviation, a variance of L1 measurements for predicting the L1 measurement, or a combination thereof based at least in part on past L1 measurements, predicted L1 measurements, or a combination thereof.

Aspect 17: A method of wireless communication performed by a network entity, comprising: transmitting configuration information that includes a rule for transmitting model parameter information associated with a model for predicting a Layer 1 (L1) measurement or for transmitting a combination of the model parameter information and an L1 measurement report; and receiving the model parameter information or the combination based at least in part on the rule.

Aspect 18: The method of Aspect 17, wherein the rule specifies when to transmit the model parameter information or the combination and when to transmit an L1 measurement report.

Aspect 19: The method of Aspect 17 or 18, further comprising detecting the model parameter information based at least in part on: a demodulation reference signal of an uplink channel that is configured for model parameter information; the model parameter information being received in a quantity of resource blocks that is configured for model parameter information; the model parameter information being received in a quantity of symbols that is configured for model parameter information; the model parameter information having a physical uplink channel format that is configured for model parameter information; the model parameter information being multiplexed with an uplink message; or a combination thereof.

Aspect 20: The method of any of Aspects 17-19, wherein the rule specifies when to transmit the model parameter information or the combination and when to transmit an L1 measurement report.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive configuration information that includes a rule for transmitting model parameter information associated with a model and used, by the model, for predicting a Layer 1 (L1) measurement or for transmitting a combination of the model parameter information and an L1 measurement report; and
      transmit the model parameter information or the combination based at least in part on the rule.

2. The UE of claim 1, wherein the rule specifies when to transmit the model parameter information or the combination and when to transmit an L1 measurement report.

3. The UE of claim 1, wherein the rule specifies that the model parameter information or the combination is to be transmitted after transmitting L1 measurement reports at each of a configured quantity of reporting instances.

4. The UE of claim 1, wherein the rule specifies that an L1 measurement report is to be transmitted after transmitting parameter information or a combination of model parameter information and an L1 measurement report at each of a configured quantity of reporting instances.

5. The UE of claim 1, wherein the rule specifies that an L1 measurement report is to be transmitted a configured quantity of empty reporting instances after transmitting the model parameter information.

6. The UE of claim 1, wherein the rule specifies that the L1 measurement report is to be transmitted if a difference between a first value predicted by the model parameter information and a second value of the L1 measurement report does not satisfy a minimum difference threshold.

7. The UE of claim 1, wherein the rule specifies that the L1 measurement report is to be transmitted instead of the model parameter information based at least in part on a beam failure detection.

8. The UE of claim 1, wherein the rule specifies that the L1 measurement report is to be transmitted instead of the model parameter information based at least in part on the L1 measurement not satisfying a measurement threshold.

9. The UE of claim 1, wherein the rule specifies that the L1 measurement report is to be transmitted instead of the model parameter information based at least in part on a payload size of the L1 measurement report not satisfying a payload size threshold, and wherein the model parameter information is transmitted if the payload size of the L1 measurement report satisfies the payload size threshold.

10. The UE of claim 1, wherein the configuration specifies a model associated with the model parameter information, parameters associated with the model parameter information, information specifying how to use the model parameter information, or a combination thereof.

11. A method of wireless communication performed by a user equipment (UE), comprising:
receiving configuration information that includes a rule for transmitting model parameter information associated with a model and used, by the model, for predicting a Layer 1 (L1) measurement or for transmitting a combination of the model parameter information and an L1 measurement report; and
transmitting the model parameter information or the combination based at least in part on the rule.

12. The method of claim 11, wherein the rule specifies when to transmit the model parameter information or the combination and when to transmit an L1 measurement report.

13. The method of claim 11, wherein the model parameter information includes one or more slope parameters indicating a rate of increase or a rate of decrease of values of L1 measurements based at least in part on past L1 measurements, predicted L1 measurements, or a combination thereof.

14. The method of claim 11, wherein the model parameter information includes a linear regression parameter, a non-linear regression parameter, a fit parameter, or a combination thereof for predicting the L1 measurement based at least in part on past L1 measurements, predicted L1 measurements, or a combination thereof.

15. The method of claim 11, wherein the model parameter information includes one or more machine learning parameters for predicting the L1 measurement based at least in part on past L1 measurements, predicted L1 measurements, or a combination thereof.

16. The method of claim 11, wherein the model parameter information includes a trending parameter for predicting the L1 measurement based at least in part on past L1 measurements, predicted L1 measurements, or a combination thereof.

17. The method of claim 11, wherein the model parameter information includes a mean value, a standard deviation, a variance of L1 measurements for predicting the L1 measurement, or a combination thereof based at least in part on past L1 measurements, predicted L1 measurements, or a combination thereof.

18. A method of wireless communication performed by a network entity, comprising:
transmitting configuration information that includes a rule for transmitting model parameter information associated with a model and used, by the model, for predicting a Layer 1 (L1) measurement or for transmitting a combination of the model parameter information and an L1 measurement report; and
receiving the model parameter information or the combination based at least in part on the rule.

19. The method of claim 18, wherein the rule specifies when to transmit the model parameter information or the combination and when to transmit an L1 measurement report.

20. The method of claim 18, further comprising detecting the model parameter information based at least in part on:
a demodulation reference signal of an uplink channel that is configured for model parameter information;
the model parameter information being received in a quantity of resource blocks that is configured for model parameter information;
the model parameter information being received in a quantity of symbols that is configured for model parameter information;
the model parameter information having a physical uplink channel format that is configured for model parameter information;
the model parameter information being multiplexed with an uplink message; or
a combination thereof.

* * * * *